Oct. 6, 1931.    C. W. ISELER    1,826,401
STEERING PITMAN ARM
Filed May 13, 1929

Inventor
Charles W. Iseler

By Blackmore, Spencer & Flail.
Attorneys

Patented Oct. 6, 1931

1,826,401

UNITED STATES PATENT OFFICE

CHARLES WILLIAM ISELER, OF DETROIT, MICHIGAN, ASSIGNOR TO GENERAL MOTORS RESEARCH CORPORATION, OF DETROIT, MICHIGAN, A CORPORATION OF DELAWARE

STEERING PITMAN ARM

Application filed May 13, 1929. Serial No. 362,610.

This invention relates to steering gear for motor vehicles and the like, and more particularly to a pitman arm for connecting the rock shaft at the lower end of the steering column with the drag bar or front wheel linkage.

It is among the objects of the present invention to provide an improved type of pitman arm for transmitting the movement of the rock shaft to the drag link, which will be simple in construction, economical to manufacture, and which may be readily embodied in conventional steering mechanism without necessitating changes in other associated parts, so that it may be easily applied either as standard equipment on new cars or in substitution for the regular pitman arm on existing vehicles.

Another object of the invention is to provide a construction which will promote the ease of steering and reduce the likelihood of loss of control, by damping and cushioning road shocks, front wheel wobble, or other violent reactions incident to vehicle travel, and preventing the imposition of damaging stresses on the steering column and the transmission of sharp and small movements to the steering wheel in the hands of the driver or operator.

Additional objects and advantages will become apparent during the course of the following specification having reference to the accompanying drawings, wherein Figure 1 is a side elevation of a fragment of a motor vehicle illustration the application of the invention.

Figure 1:
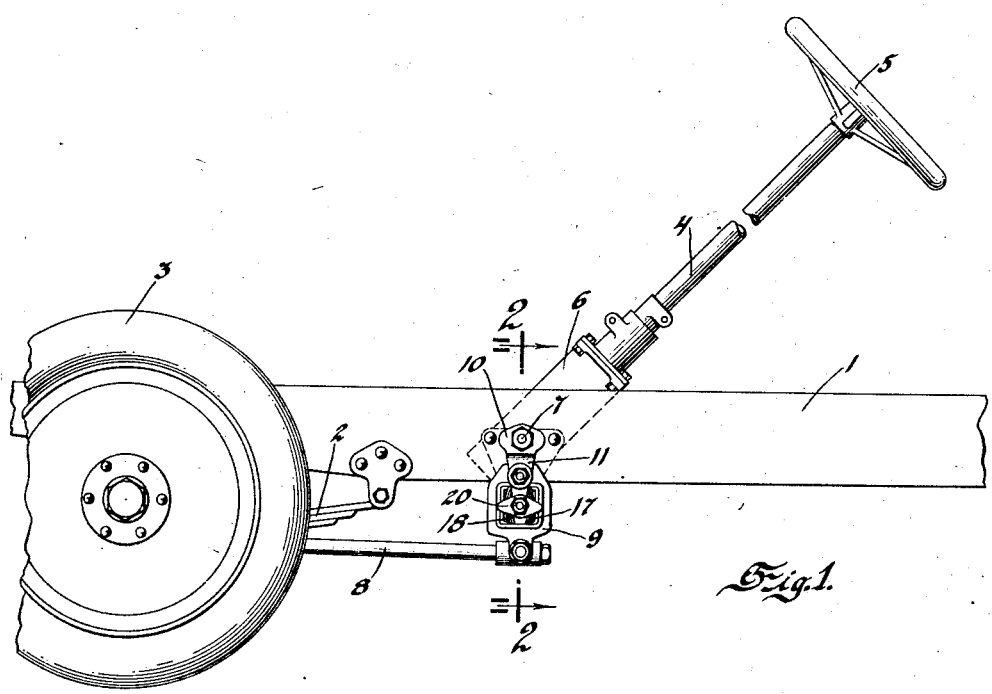
Figure 2:
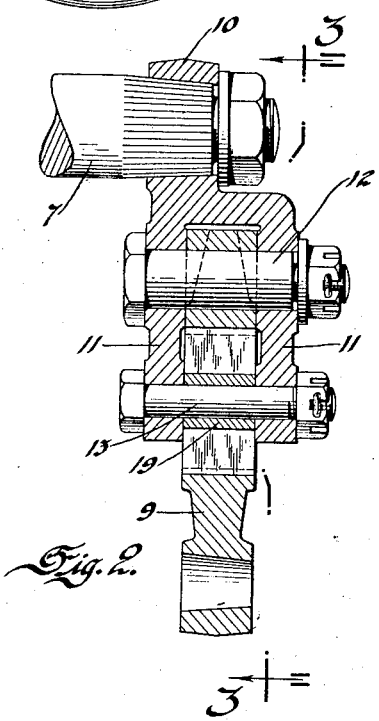
Figure 2 is a transverse sectional view of the pitman arm and is taken on line 2—2 of Figure 1.
Figure 3:
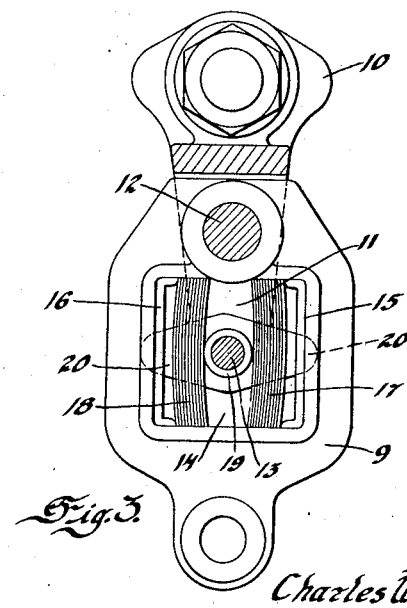
Figure 3 is a view taken on line 3—3 of Figure 2.

Referring to the accompanying drawings, the reference character 1 indicates a motor vehicle chassis frame which is flexibly supported through the multiple leaf spring 2 upon a dead axle at the front of the chassis, on the opposite ends of which are swivelled a pair of road wheels, one being indicated at 3. Supported by the chassis frame, either directly or indirectly, is a steering column 4, having at its upper end a steering wheel 5, and at its lower end a casing 6 enclosing suitable gear mechanism for transmitting the movement of the steering wheel to a laterally projecting rock shaft 7. As in the conventional hook-up, a pitman arm or lever transmits the rocking movement of the shaft 7 to a drag link or bar 8 forming a part of the steering gear linkage.

In the present case, the pitman is formed in sections, consisting of two inter-connected arms or levers 9 and 10, adapted to be fastened to the drag bar 8 and keyed or splined on the end of the rock shaft 7, respectively. The arm or lever 10 is provided with a pair of forks or legs 11 which straddle or receive the upper end of the arm 9, the arm 9 being pivotally mounted on a pin or stud 12 projecting through the forks. A pin or stud 13 extends between the lower ends of the two forks 11 and through a slot or opening 14 intermediate the ends of the arm 9. In the drawings, this slot or opening 14 is shown as being substantially square in outline, but it will be readily understood that the opening may take other shapes. In opposite sides of the opening 14 are positioned a pair of clips or seats 15 and 16 of channel or U-shape, the legs of which provide abutments or seats for the opposite ends of a pair of multiple leaf springs 17 and 18, located on opposite sides of and engaging at points intermediate their length, with a collar or sleeve 19 carried by the pin 13.

In assembling the device, the several spring leaves and spring seats are inserted loosely in the opening 14 and the arm 9 then introduced between the forks 11 and secured by the pivot pin 12. When in this position, the loosely assembled parts are prevented from falling out of the opening by wings or ears 20 projecting laterally from opposite sides of the lower portion of the forks 11 and on both sides of the opening and which ears extend entirely across and slightly beyond the opening.

From the above description, it will be seen that the two arms are connected together at spaced apart points by the pivot pin 12 and the pin and slot 13 and 14 for limited swinging movement relative to each other. The limit of movement is controlled by the size of the space within the channel of the U-shaped spring seats and the distance between adjacent surfaces of the U-shaped members and springs. Relative movement within the prescribed limits is yieldingly resisted by the respective spring elements, the tension of one spring opposing that of the other and tending to maintain the parts in centered relation.

When the driver or operator turns the steering wheel 5, the arm 11 is rocked with the shaft 7 and transmits its movement through one or the other of the springs 17—18 to pull or push on the drag link 8 and swing the front wheels. This movement may or may not deflect the springs depending upon the resistance offered by the road wheels. If the resistance is great, the particular spring may be fully deflected into the channel of the member 16 until the limit of relative movement between the arms is reached, after which the arms move in positive unison. In the event the drag link is forcibly moved or reciprocated back and forth because of road shocks, wheel wobble, or similar causes, the action of the pitman arm parts is much the same. That is, there would be a tendency for the lower arm 9 to swing about the pivot pin 12 because of the pin and slot connection 13—14 and the elasticity of the two spring members 17—18 would serve to damp or cushion these movements and prevent severe strains on the steering column mechanism.

While the device has been described more or less specifically, it is to be understood that the invention is not limited to the exact details referred to but that such modifications may be made as come within the scope of the appended claims.

I claim:

1. Motion transmitting means including a forked lever, a second lever located between and pivoted to the forks of the first lever, a member carried by said forks and projecting through the second lever, and elastic means associated with the second lever on opposite sides of the member.

2. In a vehicle steering mechanism, an articulated pitman lever, including two arms arranged end to end with their remote ends connected to the steering shaft and drag link respectively, a pivot pin connecting the adjacent ends of the arms at one point for relative swinging movement, a pin and slot connection between the adjacent ends of the arms at a point spaced from the pivot connection and elastic means adapted to yieldingly resist movement of the pin in said slot.

3. In a vehicle steering mechanism, an articulated pitman lever, including two arms arranged end to end with their remote ends connected to the steering shaft and drag link respectively, a pivot pin connecting the adjacent ends of the arms at one point for relative swinging movement, a pin and slot connection between the adjacent ends of the arms at a point spaced from the pivot connection and a pair of spring elements located in the slot on opposite sides of the pin to resist movement of the pin in the slot.

4. In a vehicle steering mechanism, an articulated pitman lever, including two arms arranged end to end with their remote ends connected to the steering shaft and drag link respectively, a pivot pin connecting the adjacent ends of the arms at one point for relative swinging movement, a pin and slot connection between the adjacent ends of the arms at a point spaced from the pivot connection and a pair of spring leaves engaging opposite sides of the pin under tension, the tension of one spring opposing that of the other to yieldingly maintain the pin centered in the slot.

5. In a vehicle steering mechanism, an articulated pitman lever, including two arms arranged end to end with their remote ends connected to the steering shaft and drag link respectively, a pivot pin connecting the adjacent ends of the arms at one point for relative swinging movement, a pin and slot connection between the arms at a point spaced from the pivot connection, a pair of leaf springs in the slot on opposite sides of the pin, each with an intermediate portion engaging the pin, and abutments for the ends of the springs.

6. Motion transmitting means, including a pair of arms, connections between the arms at two points spaced one from another, one of the connections permitting swinging movement of the arms, and the other comprising a pin on one arm extending through an opening in the other arm, a pair of multiple leaf springs positioned in said opening and engageable at intermediate points with opposite sides of the pin, and a seat for each spring consisting of a U-shaped member having its legs in engagement with opposite ends of the spring on the side opposite the pin and into the channel of which the spring is deformable.

7. Motion transmitting means, including an arm having an opening therein, spring leaves loosely positioned within said opening, a forked arm straddling the first-mentioned arm and having portions extending entirely across said opening on opposite sides thereof to retain the spring leaves therein, a pin extending between the forks through said opening and engageable with the spring leaves which yieldingly resist movement of the pin, and means to pivotally connect the two arms for relative swinging movement.

In testimony whereof I affix my signature.

CHARLES WILLIAM ISELER.